(12) United States Patent
Desbiolles

(10) Patent No.: US 7,388,528 B2
(45) Date of Patent: Jun. 17, 2008

(54) CODING METHOD AND DEVICE FOR DETERMINING ABSOLUTE ANGULAR POSITION

(75) Inventor: Pascal Desbiolles, Thorens Glieres (FR)

(73) Assignee: SNR Roulements (FR)

( * ) Notice: Subject to any disclaimer, the term of this patent is extended or adjusted under 35 U.S.C. 154(b) by 0 days.

(21) Appl. No.: 11/655,532

(22) Filed: Jan. 19, 2007

(65) Prior Publication Data
US 2007/0183070 A1    Aug. 9, 2007

(30) Foreign Application Priority Data
Jan. 19, 2005   (FR)  ................................... 06 00521

(51) Int. Cl.
*H03M 1/48* (2006.01)
(52) U.S. Cl. ........................ 341/117; 341/3; 341/17; 341/112
(58) Field of Classification Search .............. 341/1–16, 341/111–117
See application file for complete search history.

(56) References Cited

U.S. PATENT DOCUMENTS

| | | | | | |
|---|---|---|---|---|---|
| 3,555,542 | A | * | 1/1971 | Guiot | .................... 341/115 |
| 4,031,531 | A | * | 6/1977 | Rice et al. | .................... 341/116 |
| 4,078,173 | A | * | 3/1978 | Fultz | ................... 250/237 G |
| 4,216,466 | A | * | 8/1980 | Chasson et al. | ............ 341/117 |
| 4,654,636 | A | * | 3/1987 | Rusk | ........................... 341/13 |
| 4,697,125 | A | * | 9/1987 | Goff et al. | ............. 318/400.12 |
| 4,780,703 | A | * | 10/1988 | Ishida et al. | .................... 341/6 |
| 4,794,551 | A | * | 12/1988 | Yoshida | ...................... 702/145 |
| 5,225,754 | A | * | 7/1993 | Eckersley | ................... 318/560 |
| 5,739,663 | A | * | 4/1998 | Brown | ....................... 318/701 |
| 6,145,368 | A | * | 11/2000 | Klein | .......................... 73/1.75 |

\* cited by examiner

*Primary Examiner*—Linh V Nguyen
(74) *Attorney, Agent, or Firm*—Bachman & LaPointe, P.C.

(57) ABSTRACT

Method for coding at least one datum using three digital signals A, B, C delivered on respectively one channel, in which the third signal C is delivered by a combination of the first two signals A, B in order to form m binary triplets, where m<8. The method provides for modifying the third signal C according to the data to be coded in order to generate n binary triplets, where n>1, the n triplets being different from the m triplets. A device for determining the absolute angular position of a turning member is described.

9 Claims, 1 Drawing Sheet

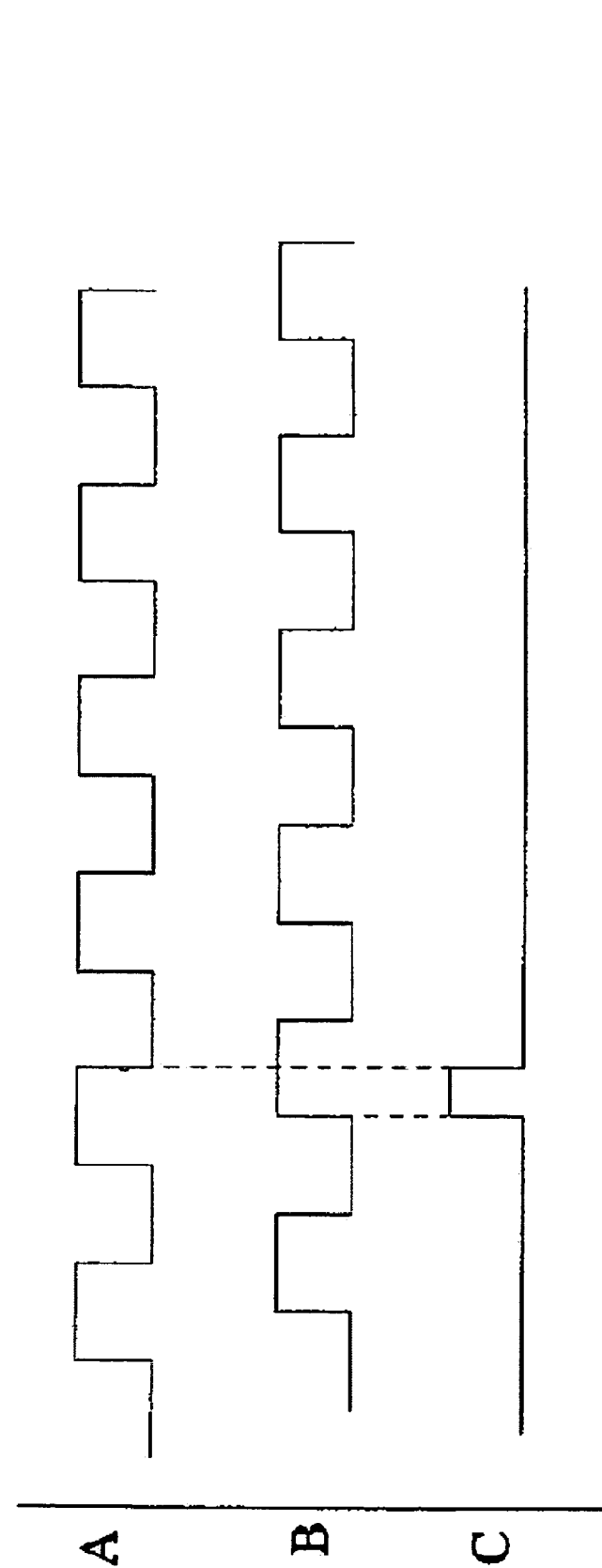

CODING METHOD AND DEVICE FOR DETERMINING ABSOLUTE ANGULAR POSITION

BACKGROUND (1) Field of the Invention

The invention relates to a method for coding at least one datum and a device for determining the absolute angular position of a rotating member.

(2) Prior Art

Devices for determining the absolute angular position of a rotating member are known, comprising:
- a coder designed to be integral with the rotating member, said coder being arranged to deliver two pseudo sine signals;
- a sensor designed to be fixed at reading distance from the coder, said sensor comprising sensitive elements that are capable of detecting the signals delivered by the coder;
- a device for processing the signals issuing from the sensor, said device being arranged to deliver three digitals A, B, C, the signals A and B being representative of the angular position of the coder and the signal C comprising at least one reference pulse;
- a central processing unit connected to the processing device, said unit being arranged to use the signals A, B, C on respectively one channel.

In fact, by using the reference pulse(s), the angular position issuing from the signals A and B can be indexed to a known reference position in order to obtain an absolute angular position with respect to said reference.

Reference can be made for example to documents FR-2 845 212 and FR-2 845 213 that describe the use of such a determination system for controlling an electronic switching motor, particularly for power steering of motor vehicles by an electrical type of power steering system.

Devices for determining an angular position are also known, which are capable of supplying other data than said position, these devices generally being used to measure the speed of rotation of a motor vehicle wheel in applications of the ABS (Anti-Blocking System) type.

Reference can be made for example to document EP 1 393 082 in which the data are transmitted using pulse trains arranged between the reference pulses.

However, this type of device is only satisfactory in applications at low speed of rotation of the rotating member, failing which the time division between two reference pulses is insufficient to contain the pulse train.

In consequence, in applications at higher speed, such as those described in document FR-2 845 213, where the speed of rotation of engine may be several thousand revolutions per minute, and especially when high resolution is required, a need still exists for a determination device for coding data in a reliable manner.

To solve this problem, the use of a fourth channel will be considered, in addition to the three channels through which the signals A, B, and C are respectively delivered, via which the additional data would be transmitted. However, this addition is unsatisfactory from the economic standpoint because of the need for an additional wire, connector and interface.

SUMMARY OF THE INVENTION

It is the object of the invention to overcome these drawbacks by proposing particularly a device for determining the absolute position that uses a high speed data coding method, without modifying the number of signal transmission channels.

For this purpose, and according to a first aspect, the invention proposes a method for coding at least one datum using three digital signals A, B, C delivered on respectively one channel, in which the third signal C is delivered by a combination of the first two signals A, B in order to form m binary triplets, where m<8, said method providing for modifying the third signal C according to the data to be coded in order to generate n binary triplets, where n>1, said n triplets being different from the m triplets.

According to a second aspect, the invention proposes a device for determining the absolute angular position of a rotating member, said device comprising:
- a coder designed to be integral with the rotating member, said coder being arranged to deliver two pseudo sine signals;
- a sensor designed to be fixed at reading distance from the coder, said sensor comprising sensitive elements that are capable of detecting the signals delivered by the coder;
- a device for processing the signals issuing from the sensor, said device being arranged to deliver three digitals A, B, C, the signals A and B being representative of the angular position of the coder and the signal C being obtained by a combination of the signals A, B in order to comprise at least one reference pulse, the respective status of the three signals A, B, C forming m binary triplets, where m<8;
- a central processing unit connected to the processing device, said unit being arranged to use the signals A, B, C on respectively one channel:

said determination device being characterised in that the processing device further comprises coding means designed, according to the reception of a datum to be coded, to modify the signal C in order to generate a binary triplet different from the m triplets, and in that the central processing unit comprises means for detecting said triplet.

BRIEF DESCRIPTION OF THE DRAWINGS

Other features and advantages of the invention will appear from the following description with reference to the FIGUREfigure appended hereto, which shows three digital signals, A, B, C according to one embodiment, the signals A and B being representative of the angular position and the signal C being obtained by combination of the signals A, B in order to comprise a reference pulse.

DETAILED DESCRIPTION OF THE PREFERRED EMBODIMENTS

The invention relates to a device for determining the absolute angular position of a rotating member. In the context of the present invention, absolute angular position here means an angular position that is calculated with respect to a reference.

In one exemplary embodiment, this type of determination device can be used to control an electronic switching motor as described in document FR-2 845 213, in which the angular resolution must be about 1° or even 0.1° with a typical speed of rotation of several thousand revolutions.

However, the invention is not at all limited to this particular application and can be used for all applications requiring the indexing of the angular position of a rotating member with respect to a reference position.

The determination device comprises a coder designed to be integral with the rotating member, said coder being arranged to deliver to two pseudo sine signals. According to one embodiment, the coder is formed from a magnetic ring comprising a main multipole track and one reference multipole track theatre concentric, said tracks comprising a succession of North and South poles of constant polar width.

Furthermore, the reference track comprises a magnetic transition that is different from the others, in order, for example, to integrate a magnetic singularity formed by a pair of poles of different widths from the others. Such a coder is, for example, described in documents FR2-769 088 and EP-0 871 014. In one embodiment, the reference track may comprise a plurality of magnetic singularities that are distributed along said track to form particular binary sequences corresponding to a defined reference.

The determination device further comprises a sensor designed to be fixed at reading distance from the coder. The sensor comprises sensitive elements, for example Hall effect probes, magnetoresistors or giant magnetoresistors, which are capable of detecting the signals delivered by the coder.

In particular, the sensor may comprise at least two sensitive elements arranged at air gap distances from the main track and at least one sensitive element placed at air gap distance from the reference track. As an alternative, the sensor may comprise a plurality of sensitive elements aligned as described in document FR2-792 403.

The determination device also comprises a device for processing the signals issuing from the sensor, said device being arranged to deliver three digital signals A, B, C.

An exemplary embodiment of these signals is shown in the FIGURE, in which the signals A, B are in quadrature, in which the signals A, B are in quadrature, and are combined by the logic operator AND in order to deliver a signal C during the detection of the magnetic singularity of the reference track.

The signals A and B are thus representative of the angular position of the coder and the signal C comprises at least one reference pulse. According to the embodiment described, the determination of the position using the signals A, B serves to determine the speed of rotation and the direction of rotation of the rotating member by incremental measurement. Furthermore, the signal C serves to retime the incremental signal to a reference state to which the reference pulse is indexed, in order to obtain an absolute position signal.

As an alternative, to increase the resolution of the signals, the processing device may comprise an interpolator, for example of the type described in document FR2-754 063.

On the basis of these three signals, eight binary triplets can theoretically be formed according to the respective status of said signals, that is 100, 110, 111, 000, 011, 001, 010 and 101.

However, as the FIGURE shows, due to the respective status of the three signals A, B, C, only one number m=5 of binary triplets are effectively formed, that is the triplets 000, 010, 100, 110 and 111.

These binary triplets are then delivered to a central processing unit that is connected to the processing device, said unit being arranged to use these signals A, B, C on respectively one channel in order to obtain an action determined accorded to the triplet received.

The processing device further comprises coding means for modifying the signal C according to the receipt of data to be coded. It is thus possible to generate a binary triplet different from the m triplets mentioned above.

In consequence, by providing that the central processing unit comprises means for detecting said triplet, it is possible to send coded data to the central processing unit so that it can implement an action determined according to this data.

As an alternative, the coding means may be arranged to code in different data, by n different modifications of the signal C, in order to generate n binary triplets that are different from one another.

In one exemplary embodiment, the data to be coded corresponds to an operating status of the determination device, particularly to an abnormal operating status. For example, if they concern operation with a gap that is too large or too small, an operating defect of the interpolator or other irregularities in the signal acquisition circuit.

Besides internal data of the determination device, the data to be coded may relate to an operating condition of the rotating member, such as, for example, the torque applied in the case of a rotor of an electronic switching motor or the state of wear of the brake shoes in the case of a motor vehicle wheel.

The processing device is connected to a device for detecting the operating status, coding means being activated by the detection of said status in order to inform the central processing unit of the operation in the corresponding status. In particular, the central processing unit can be programmed to adapt to the operating status, or to deliver a fault signal.

According to the embodiment described above, data relative to an operating status can be communicated regardless of the speed of rotation of the rotating member, including zero speed of rotation, which has become necessary particularly in connection with safety applications for a motor vehicle.

The coding method of the invention is described in greater detail below, in relation to an embodiment in which the third signal C is obtained by a combination of the first two signals A, B by the AND operator in order to form m binary triplets, where m<8.

However, the invention can be used in other embodiments of the combination of two binary signals to obtain a third binary signal in order to deliver a number of binary triplets strictly lower than the theoretically possible number.

The coding method provides for modifying the third signal C according to the data to be coded so as to generate a particular status on said signal. This particular status is arranged in order, in combination with the corresponding status of the first signals A, B to form n binary triplets (n>1) different from m binary triplets generated by combination.

The coding method thus provides for imposing a particular status on the signal C to generate a triplet that is not generated during the normal acquisition of the signals A, B, C. According to the coding method, it is possible to code n different data, where n is between one and seven.

When it is necessary to code a datum, the method provides for modifying the signal C in order to generate a particular triplet that is specific to said datum, particularly in order to transmit this datum to a central processing unit (CPU).

According to one embodiment, the third signal can be modified by changing the value of at least one pulse of the third signal C. For example, as regards pulse shown in FIG. 1, the normal triplets are successively 100 then 111 then 010. However, if the pulse width is increased towards greater angles, a status 011 can be generated between the status 111 and 010, or the triplet 010 can be replaced by the triplet 001.

It is thus possible to transmit a triplet 011 or a triplet 001 that can be correlated to a coded datum. Furthermore, it is possible to assign the triplet 011 to a triplet and the triplet 001 to another datum, that is, to modulate the width modification according to the type of data to be coded.

According to other embodiments, optionally combinable, with the preceding embodiment, the third signal can be modified by:

shifting at least one pulse of the third signal C; and/or
adding at least one pulse in the third signal C.

According to the invention, it is therefore possible to code a datum without adding additional channels to the three channels necessary to transmit the three digital signals, and without an additional limitation concerning the signal frequencies.

The invention claimed is:

1. A method for coding at least one datum using three digital signals A, B, and C delivered on respectively one channel comprising the steps of delivering a third signal C by a combination of first and second signals A, B in order to form m binary triplets, where m<8, and modifying the third signal C according to data to be coded in order to generate n binary triplets, where n>1 and said n binary triplets being different from the m binary triplets.

2. A coding method according to claim 1, further comprising obtaining the combination of the first and second signals A, B by an AND operation, in order to deliver the third signal C.

3. A coding method according to claim 1, further comprising coding n different data respectively by n different triplets.

4. A coding method according to claim 1, wherein said modifying step comprises modifying the third signal by changing a width of at least one pulse of the third signal C.

5. A coding method according to claim 1, wherein said modifying step comprises modifying the third signal by shifting at least one pulse of the third signal C.

6. A coding method according to claim 1, wherein said modifying step comprises modifying the third signal by adding at least one pulse in the third signal C.

7. A device for determining an absolute angular position of a rotating member, said device comprising:

a coder designed to be integral with the rotating member, said coder being arranged to deliver two pseudo sine signals;

a sensor designed to be fixed at reading distance from the coder, said sensor comprising sensitive elements that are capable of detecting the signals delivered by the coder;

a device for processing the signals issuing from the sensor, said device being arranged to deliver three digitals A, B, and C, the signals A and B being representative of the angular position of the coder and the signal C being obtained by a combination of the signals A and B in order to comprise at least one reference pulse, the respective status of the three signals A, B, and C forming m binary triplets, where m<8;

a central processing unit connected to the processing device, said central processing unit being arranged to use the signals A, B, and C on respectively one channel; and the processing device further comprising coding means for modifying the signal C, said coding means being designed, according to the reception of a datum to be coded, to modify the signal C in order to generate a binary triplet different from the m triplets, and the central processing unit comprising means for detecting said triplet.

8. The determination device according to claim 7, wherein the processing device is connected to a device for detecting an operating status, the coding means is activated by the detection of said status so as to inform the central processing unit of the operation in a corresponding status.

9. The determination device according to claim 7, wherein the coding means is arranged to code n different data, by n different modifications of the signal C in order to generate n binary triplets that are different from one another.

* * * * *